United States Patent
Winsberg et al.

(10) Patent No.: US 11,283,077 B2
(45) Date of Patent: Mar. 22, 2022

(54) HYBRID FLOW BATTERY FOR STORING ELECTRICAL ENERGY AND USE THEREOF

(71) Applicant: FRIEDRICH-SCHILLER-UNIVERSITÄT JENA, Jena (DE)

(72) Inventors: Jan Winsberg, Duisburg (DE); Tobias Janoschka, Jena (DE); Ulrich Sigmar Schubert, Jena (DE); Bernhard Häupler, Erlangen (DE); Martin Hager, Dornburg-Camburg (DE)

(73) Assignee: JENA BATTERIES, GMBH, Jena (DE)

(*) Notice: Subject to any disclaimer, the term of this patent is extended or adjusted under 35 U.S.C. 154(b) by 94 days.

(21) Appl. No.: 15/777,076

(22) PCT Filed: Nov. 14, 2016

(86) PCT No.: PCT/EP2016/001900
§ 371 (c)(1),
(2) Date: May 17, 2018

(87) PCT Pub. No.: WO2017/084749
PCT Pub. Date: May 26, 2017

(65) Prior Publication Data
US 2018/0331363 A1    Nov. 15, 2018

(30) Foreign Application Priority Data
Nov. 18, 2015 (DE) .......................... 102015014828.1

(51) Int. Cl.
*H01M 4/60* (2006.01)
*H01M 4/42* (2006.01)
(Continued)

(52) U.S. Cl.
CPC ............... *H01M 4/60* (2013.01); *H01M 4/38* (2013.01); *H01M 4/42* (2013.01); *H01M 8/188* (2013.01);
(Continued)

(58) Field of Classification Search
CPC ............ H01M 4/60; H01M 4/42; H01M 8/18; H01M 8/188; H01M 4/38; H01M 2250/20; H01M 2300/0005; Y02E 60/528
See application file for complete search history.

(56) References Cited

U.S. PATENT DOCUMENTS

| | | |
|---|---|---|
| 4,411,761 A | 10/1983 | Roos et al. |
| 4,771,111 A | 9/1988 | Tieke et al. |

(Continued)

FOREIGN PATENT DOCUMENTS

| | | |
|---|---|---|
| CN | 102479968 A | 5/2012 |
| CN | 102652377 A | 8/2012 |

(Continued)

OTHER PUBLICATIONS

16801707,Decision_to_grant_a_European_patent, dated Aug. 8, 2019 (Year: 2019).*

(Continued)

*Primary Examiner* — Alexander Usyatinsky
(74) *Attorney, Agent, or Firm* — Michael Ferrell

(57) ABSTRACT

A redox flow battery is characterized in that the anolyte comprises a zinc salt as redox-active component and preferably a 2.2.6.6-tetramethylpiperidinyloxyl (TEMPO)-based cathode is used.

15 Claims, 3 Drawing Sheets

(51) Int. Cl.
*H01M 8/18* (2006.01)
*H01M 4/38* (2006.01)

(52) U.S. Cl.
CPC .............. *H01M 2250/20* (2013.01); *H01M 2300/0005* (2013.01); *Y02E 60/50* (2013.01)

(56) References Cited

U.S. PATENT DOCUMENTS

| | | | | |
|---|---|---|---|---|
| 2012/0244405 | A1* | 9/2012 | Shigematsu | H01M 50/543 429/105 |
| 2012/0282509 | A1* | 11/2012 | Shigematsu | H01M 50/77 429/109 |
| 2013/0266836 | A1 | 10/2013 | Wang et al. | |
| 2015/0207165 | A1* | 7/2015 | Schubert | H01M 8/20 429/50 |
| 2015/0280259 | A1* | 10/2015 | Anderson | H01M 8/188 429/409 |
| 2018/0241065 | A1 | 8/2018 | Schubert et al. | |

FOREIGN PATENT DOCUMENTS

| | | | |
|---|---|---|---|
| CN | 104582820 A | | 4/2015 |
| DE | 102014001816 A1 | | 8/2015 |
| EP | 0042984 A1 | | 1/1982 |
| EP | 0191726 A2 | | 8/1986 |
| EP | 0206133 A1 | | 12/1986 |
| EP | 2485312 | * | 3/2011 |
| EP | 2485312 A1 | | 8/2012 |
| EP | 2785442 | * | 10/2014 |
| WO | 2015120971 A1 | | 8/2015 |
| WO | 2016168459 A1 | | 10/2016 |
| WO | WO 2015120971 | * | 8/2020 |

OTHER PUBLICATIONS

Takechi et.al Adv. Mater. 2015, 27, 2501-2506 (Year: 2015).*
WO 2015120971 MT (Year: 2020).*
International Search Report dated Feb. 6, 2017.
Written opinion dated Feb. 6, 2017.
B. Fang, et al.: "A Study of the Ce (III)/Ce (IV) redox couple for redox flow battery application", Electrochimica Acta, 2002, pp. 3971-3976, vol. 47, Iss. 24, Elsevier Science Ltd.
P. Leung, et al.: "Zinc deposition and dissolution in methanesulfonic acid onto a carbon composite electrode as the negative electrode reactions in a hybrid redox flow battery", Electrochimica Acta, 2011, pp. 6536-6546, vol. 56, Iss. 18, Elsevier, Ltd.
J. Cheng, et al., "Preliminary study of a single flow zinc-nickel battery", Electrochemistry Communications, 2007, pp. 2639-2642, vol. 9, Iss. 11, Elsevier B.V.
M. H. Chakrabarti, et al.: "Ruthenium based redox flow battery for solar energy storage", Energy Conversion and Management, 2011, pp. 2501-2508, vol. 52, Iss. 7, Elsevier Ltd.
C-H. Bae, et al.: "Chromium redox couples for application to redox flow batteries", Electrochimica Acta, 2002, pp. 279-287, vol. 48, Iss. 3, Elsevier Science Ltd.
T. Yamamura, et al.: "Electrochemical investigation of uranium β-diketonates for all-uranium redox flow battery", Electrochimica Acta, 2002, pp. 43-50, vol. 48, Iss. 1, Elsevier Science Ltd.
F. Xue, et al.: "Investigation on the electrode process of the Mn(II)/Mn(III) couple in redox flow battery", Electrochimica Acta, 2008, pp. 6636-6642, vol. 53, Iss. 22, Elsevier Ltd.
Y. Xu, et al.: "A study of iron in aqueous solutions for redox flow battery application", Electrochimica Acta, 2010, pp. 715-720, vol. 55, Iss. 3, Elsevier Ltd.
R. A. Putt, et al., "Development of zinc bromine batteries for utility energy storage," Gould, Inc., for Electric Power Research Institute, 1981, pp. 1-31.
B. Li, et al.: Ambipolar zinc-polyiodide electrolyte for a high-energy density aqueous redox flow battery, Nature communications, 2015, pp. 1-8, vol. 6, Art. 6303, Macmillan Publishers Limited.
Y. Zhao, et al.: "A single flow zinc//polyaniline suspension rechargeable battery", Journal of Power Sources, 2013, pp. 449-453, vol. 241, Elsevier B.V.
L. Dunsch: "Elektrochemische Reaktionen an Glaskohlenstoff" (electrochemical reactions on glassy carbon), Zeitschrift für Chemie, pp. 463-468, Dec. 1974, vol. 14, Iss. 12, Veb Deutscher Verlag Für Grundstoffindustrie, Liepzig.
T. Janoschka, et al.: "An aqueous, polymer-based redox-flow battery using non-corrosive, safe, and low-cost materials", Nature, Oct. 21, 2015, pp. 78-81 (and extended data tables and figures), vol. 527, Nr. 7576.
Z. Li, et al.: "Electrochemical Properties of an All-Organic Redox Flow Battery Using 2,2,6,6-Tetramethyl-1-Piperidinyloxy and N-Methylphthalimide", Electrochemical and Solid-State Letters, 2011, A171-A173, vol. 14, Iss. 12, The Electrochemical Society.
Chinese Office Action dated Nov. 2, 2020.

* cited by examiner

HYBRID FLOW BATTERY FOR STORING ELECTRICAL ENERGY AND USE THEREOF

CLAIM FOR PRIORITY

This patent application is a national stage application under 35 USC 371 of international application PCT/EP2016/001900, filed Nov. 14, 2016, which was based on application DE 10 2015 014 828.1, filed Nov. 18, 2015. The priorities of PCT/EP2016/0019000 and DE 10 2015 014 828.1 are hereby claimed and their disclosures are incorporated herein by reference.

BACKGROUND OF THE INVENTION

The invention relates to a redox flow battery (RFB). Such systems are used to store electrical energy based on electrochemical redox reactions. A redox flow battery contains two polarity-specific chambers (half-cells) separated by a membrane, each being filled with a liquid and being fed by one or more separate tanks of any size through pumps. The respective liquid contains water, inorganic acid and/or organic solvent in which the respective redox-active substances as well as an inorganic or organic salt (conducting additive) are dissolved. The conducting additive itself can also be redox-active. Via the membrane, ions of the conducting additive can be exchanged between the two chambers to ensure charge neutrality within the respective liquid in each charge state. The respective redox-active substances are prevented by the membrane from the exchange between the half-cells.

Due to their excellent scalability, the cells are particularly suitable as stationary energy storage for various performance and capacity demands. For example, as buffer systems for renewable energies, both in private (e.g. single or multi-family houses), as well as in industrial sectors (e.g. wind and solar power plants). They therefore have great potential for the guarantee of power grid stability and for decentralized energy supply. But also mobile applications (electric cars) are conceivable.

Existing RFB's are electrochemical energy storages. The substances necessary for potential adjustment at the electrodes are liquid, dissolved or even in particle form occurring redox-active species, which are transferred in an electrochemical reactor during the charging or discharging process into their respective other redox stage. For this purpose, the electrolyte solutions (catholyte, anolyte) are removed from a tank and are actively pumped to the electrodes. Anode and cathode space are separated in the reactor by a semipermeable membrane, which usually shows a high selectivity for protons. Power can be extracted as long as electrolyte solution is pumped. The charging process is simply the reversal of the operation. This means that the amount of energy that can be stored in a RFB is directly proportional to the size of the storage tank. The extractable power, on the other hand, is a function of the size of the electrochemical reactor.

RFB have a complex system technique that is roughly equivalent to that of a fuel cell. The standard sizes of the individual reactors are around 2 to 50 kW. The reactors can be combined very simply modularly, as well as the tank size can be adjusted almost arbitrarily.

In this context, RFB is particularly important, which works with vanadium compounds as redox couple on both sides (VRFB). This system was first described in 1986 (AU 575247 B) and is currently the technical standard. Further inorganic, low molecular redox couples were investigated, among others, on the basis of cerium (B. Fang, S. Iwasa, Y. Wei, T. Arai, M. Kumagai: "A Study of the Ce (III)/Ce (LV) redox couple for redox flow battery application", Electrochimica Acta 47, 2002, 3971-3976), Zinc-Cerium (P. Leung, C. Ponce-de-Leon, C. Low, F. Walsh: "Zinc deposition and dissolution in methanesulfonic acid onto a carbon composite electrode as the negative electrode reactions in a hybrid redox flow battery", Electrochimica Acta 56, 2011, 6536-6546), zinc-nickel (J. Cheng, L. Zang, Y. Yang, Y. Wen, G. Cao, X. Wang, "Preliminary study of a single flow zinc-nickel battery", Electrochemistry Communications 9, 2007, 2639-2642), Ruthenium (M. H. Chakrabarti, E. Pelham, L. Roberts, C. Bae, M. Salem: "Ruthenium based redox flow battery for solar energy storage", Energy Conv. Manag. 52, 2011, 2501-2508), chromium (C-H. Bae, E. P. L. Roberts, R. A. W. Dryfe: "Chromium redox couples for application to redox flow batteries", Electrochimica Acta 48, 2002, 279-87), uranium (T. Yamamura, Y. Shiokawa, H. Yamana, H. Moriyama: "Electrochemical investigation of uranium ß-diketonates for all-uranium redox flow battery", Electrochimica Acta 48, 2002, 43-50), manganese (F. Xue, Y. Wang, W. Hong Wang, X. Wang: "Investigation on the electrode process of the Mn(II)/Mn(III) couple in redox flow battery", Electrochimica Acta 53, 2008, 6636-6642) and iron (Y. Xu, Y. Wen, J. Cheng, G. Cao, Y. Yang: "A study of iron in aqueous solutions for redox flow battery application", Electrochimica Acta 55, 2010, 715-720). However, these systems are based on metal-containing electrolytes, which are toxic or harmful to the environment.

Besides these metal-based systems, metal-halogen-flow batteries are also known. The zinc-bromine-flow battery is a representative of this class (R. A. Putt, A. Attia, "Development of zinc bromides batteries for stationery energy storage," Gould, Inc., for Electric Power Research Institute, Project 635-2, EM-2497, 1982). Here the redox couple $Zn(II)/Zn(0)$ and the redox couple $Br_2/2Br$ are used. In order to prevent the highly toxic $Br_2$ gas from leaking, it must be kept as a particle in the electrolyte by using often expensive complexation reagents. This in turn causes high acquisition costs and a permanent leak of $Br_2$ gas cannot be completely excluded. Thus, strong security concerns are associated with the operation of this system. Alternatively the redox couple iodine-polyiodide can be used instead of the redox couple bromine-bromide (B. Li, Z. Nie, M. Vijayakumar, G. Li, J. Liu, V. Sprenkle, W. Wang: "Ambipolar zinc-polyiodide electrolyte for a high-energy density aqueous redox flow battery, Nature communications 6, 2015, 6303), which lowers the potential hazards compared to a bromine-bromide cathode, but still maintains the adverse properties of a halogen-based cathode.

Purely organic redox compounds have hardly been used in RFB until now. Thus, low molecular weight 2,2,6,6-tetramethylpiperidinyloxyl (TEMPO) and N-methylphthalimide was used in a RFB with an ion conductive membrane (Z. Li, S. Li, S. Q. Liu, K. L. Huang, D. Fang, F. C. Wang, S. Peng: "Electrochemical properties of an all-organic redox flow battery using 2,2,6,6-tetramethyl-1-piperidinyloxy and N-methylphthalimide", Electrochem. Solid State Lett. 2011, 14, A171-A173). Only very low current intensities and a few charge-discharge cycles could be achieved here.

Furthermore, a redox flow battery is described, which uses as redox-active substances high molecular compounds (polymers) and as a separator a semipermeable membrane (e.g. a size-exclusion membrane) (T. Janoschka, M. Hager, U.S. Schubert: "Redox flow cell with high molecular compounds as redox couple and semipermeable membrane for storing electrical energy", WO 2014/026728 A1). Due to the low solubility of polymers compared to inorganic salts, the polymer based RFB do not achieve the capacities of RFB on the basis of low molecular redox-active substances.

Furthermore, an energy reservoir is described consisting of a solid zinc anode and a polyaniline cathode. Polyaniline (PANI) is a conjugated macromolecule and is used in this case in the form of particles (as a suspension) in an aqueous electrolyte (Y. Zhao, S. Si, C. Liao: "A single flow zinc// polyaniline suspension rechargeable battery", J. Power Sources, 2013, 241, 449-453). Conjugated polymers are not suitable as redox-active substances in energy stores, since the redox reactions of these do not run at a constant potential, but vary according to the charge state of the polymer. This results in steep potential curves depending on the charge state. Likewise, only 30 charging/discharging cycles were shown here, which implies a short service life of the system.

US 2013/0266836 A1 describes a RFB containing a non-aqueous electrolyte. As a redox-active component an alkaline metal salt or a transition metal salt can be used in the anolyte whose redox-active ions are dissolved in the non-aqueous organic solvent. As redox-active ions those of lithium, titanium, zinc, chromium, manganese, iron, nickel and copper are mentioned. In one embodiment, soluble anthraquinone derivatives (AQ) or 2,2,6,6-tetramethyl-1-piperidinyloxy derivatives (TEMPO) can be used for the catholyte in non-aqueous organic solvents. The RFB described is characterized by a high energy density.

SUMMARY OF THE INVENTION

The invention is based on the objective of creating a redox flow battery, which allows cost and effort savings in the area of the components used, in particular in the field of redox-active substances, and also an improved environmental compatibility and an improved insensitivity to external influences, in particular an improved insensitivity to atmospheric oxygen. The RFB shall also distinguish itself by flat potential curves depending on the charge state. Furthermore, the RFB shall expand the usable potential window in aqueous media, the total volume of the RFB shall be reduced, and the RFB shall have an increased overall efficiency.

This objective is solved by the provision of the hybrid flow battery described in claim 1.

BRIEF DESCRIPTION OF THE DRAWINGS

The invention is described in detail below with reference to the appended drawings. In the Figures.

DETAILED DESCRIPTION OF THE INVENTION

The term "battery" is used in the context of this description in its broadest meaning. This can be a single rechargeable electrochemical cell or a combination of several such electrochemical cells.

The term "hybrid flow battery" is used in the context of this description as a redox flow battery, in which a redox-active material is not present in all redox states in solution, as dispersion or in liquid form, but also occurs in solid form on an electrode. In the following, this hybrid flow battery is also called redox flow battery.

Figure 1:
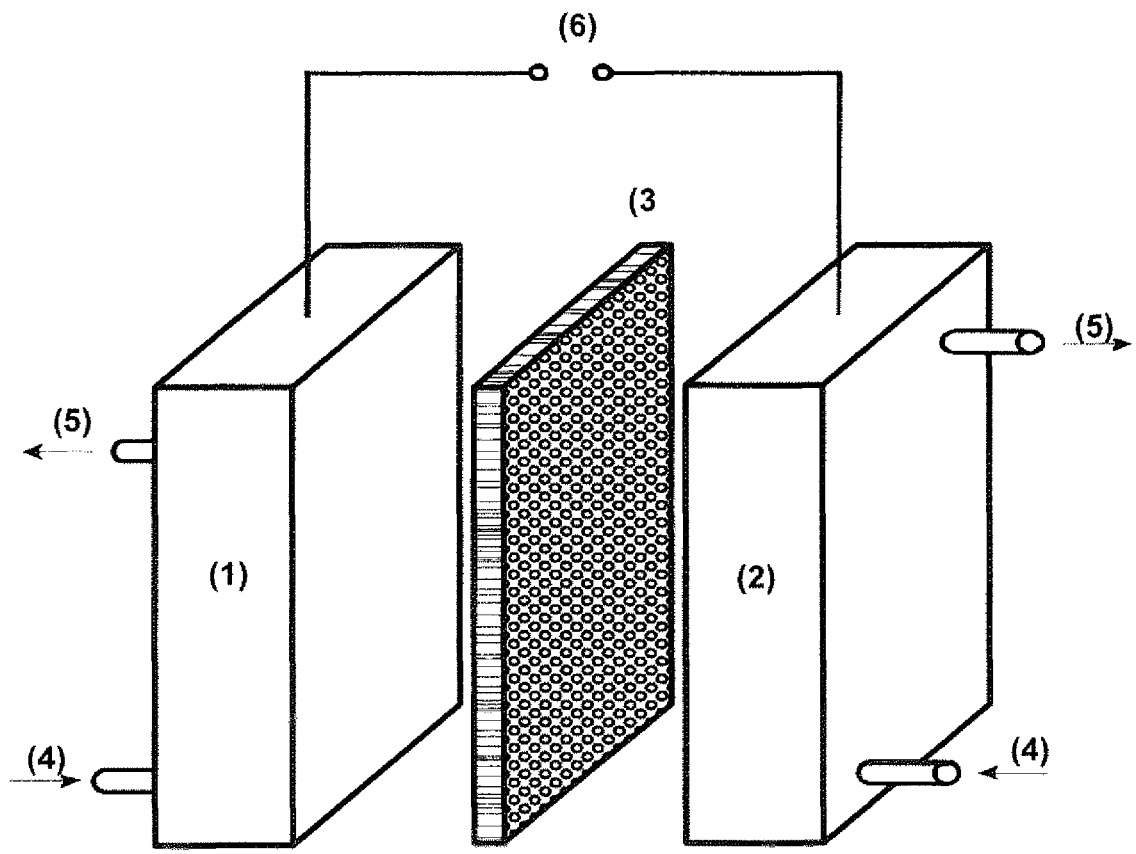
FIG. 1 is a diagram of a redox flow battery according to the invention.

FIG. 1 shows a diagram of the redox flow battery according to the invention. Two polarity specific chambers are shown (one for catholyte and one for anolyte, respectively (1, 2)), one semipermeable membrane (3), inlet fitting (4) to the chambers, outlet fittings (5) from the chambers and current collectors (6) are shown.

In the presentation the required pumps and tanks are not shown. The redox flow battery for energy storage shown in FIG. 1 therefore contains a reaction cell with two polarity-specific chambers for catholyte and anolyte (1, 2), which can each be connected with a liquid reservoir (tank) via pumps and which are separated by a semipermeable membrane (3), which is impermeable for the redox pair in the catholyte. The chambers (1, 2) are each filled with redox-active components, which are present in substance, dissolved or in solid form in water or in water and in an organic solvent, as well as dissolved conducting additives and possible auxiliary additives.

According to the invention as a redox-active component on the one hand a zinc-based anode is used and on the other hand an electrode based on 2.2.6.6 tetrasubstituted piperidinyloxyl-, such as a 2.2.6.6-tetramethylpiperidinyloxyl (TEMPO)-based cathode is used.

As current collector (6) all components are denominated that allow the transmission of electrical current to the electrodes. At the electrodes (cathode and anode), which are in direct contact with the electrolyte, the redox reactions take place.

The electrolyte itself consists of a liquid aqueous medium that contains both the redox-active species as well as organic or inorganic salts (conducting additives). Additional auxiliary additives can also be present in the electrolyte.

Zinc is used as redox-active anode material. Particularly noteworthy are the different aggregate states that zinc can adopt within the battery.

Figure 2:
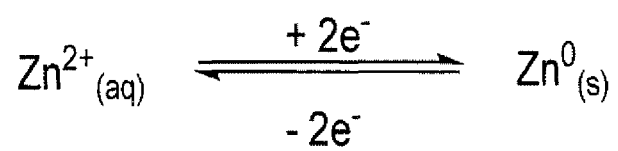
FIG. 2 shows the redox equation of zinc during the charging/discharging process.

During the charging process, zinc-(II)-cations dissolved in the electrolyte are reduced to elementary zinc(0) at the anode surface. This requires two electrons to be absorbed. The active material zinc therefore occurs in the battery in both in dissolved and in solid form. FIG. 2 shows the redox equation of zinc during the charging/discharging process.

The solid zinc anode can be permanently available as a metallic electrode or can be even formed in situ by the reduction of zinc cations during the charging process of the battery on an electrically conductive surface within the chamber. The zinc cations can act mainly as active material, but also secondary as a conducting additive or as part of a conducting additive mixture.

The cathode, also known as catholyte, is formed by the redox-active substance 2.2.6.6-tetrasubstituted piperidinyloxyl. A preferred representative of this is 2.2.6.6-tetramethylpiperidinyloxyl (TEMPO). The 2.2.6.6-tetrasubstituted piperidinyloxyl can be used both as a low molecular weight or as a oligomeric compound or as part of a high molecular compound, also known as a macromolecule. At the latter, the 2.2.6.6-tetrasubstituted piperidinyloxyl units are located in the side chains of the macromolecule. Besides the redox-active units, the macromolecule can additionally carry further side chains that improve the solubility in the electrolyte, for example. In addition to the 2.2.6.6-tetrasubstitution, the piperidinyloxyl unit can still be modified by further substituents.

The cathode can contain the molecules with the 2.2.6.6-tetrasubstituted piperidinyloxyl units in dissolved form or also as a dispersion in an aqueous or aqueous-organic electrolyte. In addition, the molecules with the 2.2.6.6-tetrasubstituted piperidinyloxyl units can also be liquid compounds.

Figure 3:
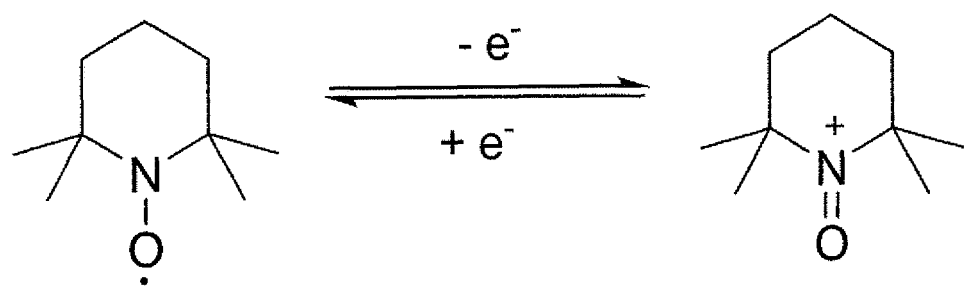
FIG. 3 shows the redox equation of TEMPO during the charging/discharging process.

The 2.2.6.6-tetrasubstituted piperidinyloxyl units are oxidized to N-oxoammonium units during the charging process and are reduced to piperidinyloxyl units when discharged. FIG. 3 shows the redox equation of TEMPO during the charging/discharging process.

In the hybrid flow battery of this invention a catholyte is used comprising as a redox-active component a compound having at least one residue of formula I in the molecule

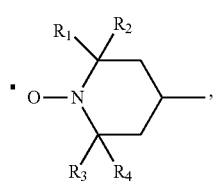

(I)

wherein the line going off the 4-position in the structure of formula I represents a covalent bond, which connects the structure of formula I with the remainder of the molecule, and $R_1$, $R_2$, $R_3$ and $R_4$ independently of one another represent alkyl, cycloalkyl, aryl or aralkyl.

As stated above, the residue of the formula I can be part of a low molecular, oligomer or polymer molecule.

In the context of this description low molecular molecules are to be understood as compounds which do not have recurrent structural units derived from monomers and which contain at least one, preferably one to six, preferably one to four, in particular one to three and particularly preferred one or two residues of the formula I.

In the context of this description oligomer molecules are to be understood as compounds which do have two to ten recurrent structural units derived from monomers, each bearing a residue of the formula I.

In the context of this description polymer molecules are to be understood as compounds containing more than ten, preferably eleven to fifty of the recurrent structural units derived from monomers, each bearing a residue of the formula I.

In a preferred embodiment of the invention, the catholyte contains a redox-active component with one to six, preferably one to four, in particular one to three and especially preferred one to two residues of the formula I in the molecule.

In an especially preferred embodiment of the invention the catholyte comprises as redox-active component a compound of formulae Ia, Ib, Ic, Id, Ie and/or If

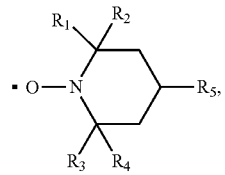

(Ia)

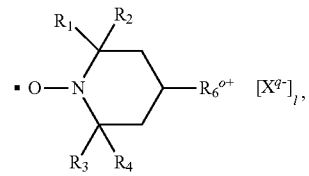

(Ib)

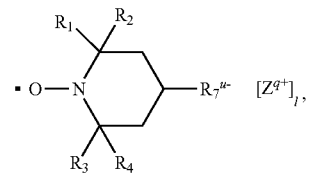

(Ic)

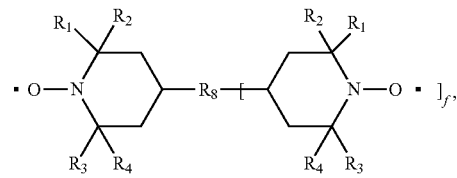

(Id)

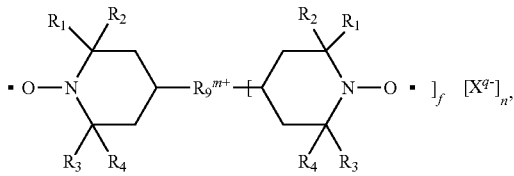

(Ie)

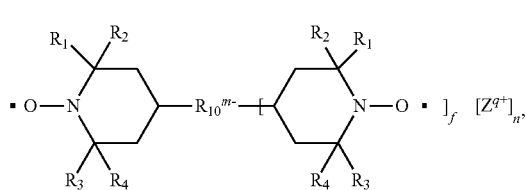

(If)

wherein
$R_1$, $R_2$, $R_3$ and $R_4$ have the meaning defined above,
X is a q-valent inorganic or organic anion or a mixture of such anions,
q is an integer from 1 to 3,
o is an integer from 1 to 4,
u is an integer from 1 to 4,
$R_8$ is a two- to four-valent organic bridge group,
$R_5$ is hydrogen, alkyl, alkoxy, haloalkyl, cycloalkyl, aryl, aralkyl, heterocyclyl, halogen, hydroxy, amino, nitro or cyano, and
$R_6$ is an o-times, preferably a single positively charged monovalent organic residue, in particular a quaternary ammonium residue, a quaternary phosphonium residue, a ternary sulfonium residue, or an o-times, preferably a single positively charged monovalent heterocyclic residue, $R_9$ is an m-times positively charged two-to four-valent organic residue, in particular a two- to four-valent quaternary ammonium residue, a two-to four-valent quaternary phosphonium residue, a two-to-three-valent ternary sulfonium residue or an m-times positively charged two to four-valent heterocyclic residue, $R_7$ is an u-times, preferably a single negatively charged monovalent residue, in particular a carboxyl or sulfonic acid residue or an u-times, preferably a single negatively charged monovalent heterocyclic residue, $R_{10}$ is an m-times negatively charged two-to-four-valent organic residue, in particular an alkylene residue substituted with one with one or two carboxyl groups or sulfonic acid groups, or a phenylene residue substituted with one or two carboxyl groups or sulfonic acid groups, or a two-valent heterocyclic residue substituted with one or two carboxyl groups or sulfonic acid groups, Z is a q-valent inorganic or organic cation or a mixture of such cations, f is an integer from 1 to 3, l is a number with the value o/q or u/q, m is an integer from 1 to 4, and n is a number with the value m/q.

Additional redox-active components used according to the invention are oligomers or polymers comprising a backbond comprising more of the redox-active units of formula I defined above.

Examples of oligomers or polymers having several redox-active units of formula I are oligomers or polymers comprising the recurring structural units of formula II

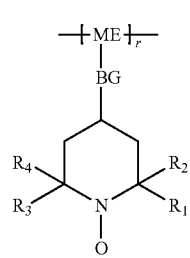

(II)

wherein $R_1$, $R_2$, $R_3$ and $R_4$ have the meaning defined above,

ME is a recurring structural unit derived from a polymerizable monomer,

BG is a covalent bond or a bridge group, and r is an integer from 2 to 150, preferably from 2 to 80 and is especially preferred from 8 to 40.

The recurring units ME and BG form the backbone of the oligomer or polymer, which contains several units of the above defined redox-active unit of formula I.

Examples of material classes that can form the backbone of the oligomers or polymers are polymers derived from ethylenically unsaturated carboxylic acids or their esters or amides, such as polymethacrylate, polyacrylate, polymethacrylamide or polyacrylamide, polymers derived from ethylenically unsaturated aryl compounds, such as polystyrene, polymers derived from vinyl esters of saturated carboxylic acids or their derivatives, such as polyvinyl acetate or polyvinyl alcohol, polymers derived from olefins or from bi- or polycyclic olefins, such as polyethylene, polypropylene or polynorbornene, polyimides derived from imide-forming tetracarboxylic acids and diamines, polymers derived from naturally-occurring polymers and their chemically modified derivatives, such as cellulose or cellulose ether, as well as polyurethanes, polyvinylethers, polythiophenes, polyacetylens, polyalkylenglycols, poly-7-oxa-norbornenes, polysiloxanes, polyethylene glycol and their derivatives, such as their ethers.

The following are examples of combinations of the structural units ME and the bridge groups BG for some of the above mentioned substance classes. These are

| | | | |
|---|---|---|---|
| polymethacrylate | BG = —COO— | M = | $-\!\!\left[CH_2-\underset{\mid}{\overset{CH_3}{C}}\right]\!\!-$ |
| polyacrylate | BG = —COO— | M = | $-\!\!\left[CH_2-\underset{\mid}{CH}\right]\!\!-$ |
| polymethacrylamide | BG = —CONH— | Me = | $-\!\!\left[CH_2-\underset{\mid}{\overset{CH_3}{C}}\right]\!\!-$ |
| polyacrylamide | BG = —CONH— | Me = | $-\!\!\left[CH_2-\underset{\mid}{CH}\right]\!\!-$ |
| polystyrene | BG = covalente C—C-bond or —CH$_2$— or —NH— | Me = | $-\!\!\left[CH_2-\underset{\mid}{CH}\right]\!\!-$ (phenyl) |
| polyvinylacetate | BG = covalent C—C-bond | Me = | $-\!\!\left[CH_2-\underset{\mid}{CH}\right]\!\!-$ O—C(=O)—CH$_2$— |
| polyethylene | BG = covalent C—C-bond | Me = | $-\!\!\left[CH_2-\underset{\mid}{CH}\right]\!\!-$ |
| polypropylene | BG = covalent C—C-bond | Me = | $-\!\!\left[CH_2-\underset{\mid}{\overset{CH_3}{C}}\right]\!\!-$ |
| polyvinylether | BG = —O— | Me = | $-\!\!\left[CH_2-\underset{\mid}{CH}\right]\!\!-$ |

Particularly preferably used compound classes forming the backbone of the oligomers or polymers are polymethacrylates, polyacrylates, polystyrene and polyvinylether.

The redox-active units of formula I are covalently connected to the polymer backbone.

The redox-active components containing polymers may be available as linear polymers or they are comb and star polymers, dendrimers, ladder polymers, ring-shaped polymers, polycatenanes and polyrotaxanes.

Preferably, comb and star polymers, dendrimers, ladder polymers, ring-shaped polymers, polycatenanes and polyrotaxanes are used. These types are characterized by an increased solubility and the viscosity of the obtained solutions is usually lower than for corresponding linear polymers.

The solubility of the polymers comprising redox-active components used according to the invention can be improved by co-polymerization or by functionalization, e.g. with polyethylene glycol, polymethacrylic acid, polyacrylic acid or polystyrene sulfonate.

The production of the redox-active oligomers or polymer components used according to the invention can be performed with the usual polymerization methods. Examples thereof are the polymerization in substance, the polymerisation in solution or the emulsion or suspension polymerization. These procedures are well known to the skilled person.

An example of a preferably used oligomeric or polymeric redox-active component is an oligomer or a polymer derived from TEMPO-methacrylate and/or from TEMPO-acrylate, in particular a cooligomer or copolymer derived from TEMPO-methacrylate and/or from TEMPO-acrylate copolymer which has been copolymerized to improve solubility with [2-(methacryloyloxy) ethyl]amine or ammonium salts derived therefrom, such as the trimethylammoniumchloride, and/or with [2-(acryloyloxy) ethyl]-amine or ammonium salts derived therefrom, such as the trimethylammoniumchloride.

If one of the residues $R_1$, $R_2$, $R_3$, $R_4$ and/or $R_5$ is alkyl, the alkyl group can be both branched and unbranched. An alkyl group typically contains one to twenty carbon atoms, preferably one to ten carbon atoms. Examples of alkyl groups are: methyl, ethyl, n-propyl, isopropyl, n-butyl, sec-butyl, tert.-butyl, pentyl, n-hexyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl or eicosyl. Alkyl groups with one to six carbon atoms are particularly preferred. Alkyl groups may be substituted, for example with carboxyl groups or sulfonic acid groups, with carboxylic ester groups or sulfonic ester groups, with carboxyl amide groups or sulfonamide groups, with hydroxyl groups or amino groups or with halogen atoms.

If the residue $R_5$ is alkoxy, the alkoxy group can consist of an alkyl unit that can be both branched and unbranched. An alkoxy group typically contains one to twenty carbon atoms, preferably one to ten carbon atoms. Examples of alkoxy groups are: methoxy, ethoxy, isopropoxy, n-butoxy, sec.-butoxy, tert.-butoxy, pentyloxy, n-hexyloxy, n-heptyloxy, 2-ethylhexyloxy, n-octyloxy, n-nonyloxy, n-decyloxy, n-tridecyloxy, n-tetradecyloxy, n-pentadecyloxy, n-hexadecyloxy, n-octadecyloxy or eicosyloxy. Alkoxy groups with one to six carbon atoms are particularly preferred.

If the residue $R_5$ is haloalkyl, the haloalkyl group can be both branched and unbranched. A haloalkyl group typically contains one to twenty carbon atoms, which in turn are substituted independently of one another with one or more halogen atoms, preferably one to ten carbon atoms. Examples of halogen atoms are fluorine, chlorine, bromine or iodine. Fluorine and chlorine are preferred. Examples of haloalkyl groups are: trifluoromethyl, difluoromethyl, fluoromethyl, bromodifluoro-methyl, 2-chloroethyl, 2-bromoethyl, 1.1-difluoroethyl, 2.2.2-trifluoroethyl, 1.1.2.2-tetrafluoroethyl, 2-chloro-1,1,2-trifluoroethyl, pentafluoroethyl, 3-bromopropyl, 2.2.3.3-tetrafluoropropyl, 1.1.2.3.3.3-hexafluoropropyl, 1.1.1.3.3.3-hexafluoropropyl, 3-bromo-2-methylpropyl, 4-bromobutyl, perfluoropentyl.

If one of the residues $R_1$, $R_2$, $R_3$, $R_4$ and/or $R_5$ is cycloalkyl the cycloalkyl group typically is a cyclic group containing three to eight, preferably five, six or seven ring carbon atoms, each independently of one another may be substituted. Examples of substituents are alkyl groups or two alkyl groups, which together with the ring carbons to which they are attached can form another ring. Examples of cycloalkyl groups are cyclopropyl, cyclopentyl, or cyclohexyl. Cycloalkyl groups may be substituted, for example with carboxyl groups or sulfonic acid groups, with carboxylic ester groups or with sulfonic ester groups, with carboxylamide groups or with sulfonamide groups, with hydroxyl groups or amino groups or with halogen atoms.

If one of the residues $R_1$, $R_2$, $R_3$, $R_4$ and/or $R_5$ is aryl, the aryl group typically is a cyclic aromatic group containing five to fourteen carbon atoms, each independently of one another may be substituted. Examples of substituents are alkyl groups or two alkyl groups, which together with the ring carbon atoms to which they are attached can form another ring. Examples of aryl groups are phenyl, biphenyl, anthryl or phenantolyl. Aryl groups may be substituted, for example with carboxyl groups or sulfonic acid groups, with carboxyl ester groups or sulfonic ester groups, with carboxylamide groups or sulfonamide groups, with hydroxyl groups or amino groups or with halogen atoms.

If the residue $R_5$ is heterocyclyl, the heterocyclyl group typically is a cyclic group containing four to ten ring carbon atoms and at least one ring hetero atom, each independently of one another may be substituted. Examples of substituents are alkyl groups or two alkyl groups, which together with the ring carbon atoms to which they are attached can form another ring. Examples of hetero atoms are oxygen, nitrogen, phosphorous, boron, selenium or sulfur. Examples of heterocyclyl groups are furyl, thienyl, pyrrolyl or imidazolyl. Heterocyclyl groups preferably are aromatic. Heterocyclyl groups may be substituted, for example with carboxyl groups or sulfonic acid groups, with carboxyl ester groups or sulfonic ester groups, with carboxylamide groups or sulfonamide groups, with hydroxyl groups or amino groups or with halogen atoms.

If one of the residues $R_1$, $R_2$, $R_3$, $R_4$ and/or $R_5$ is aralkyl, the aralkyl group typically is an aryl group, wherein aryl has been previously defined, which is covalently attached to an alkyl group. The aralkyl group can be substituted on the aromatic ring for example with alkyl groups or with halogen atoms. An example of an aralkyl group is benzyl. Aralkyl groups may be substituted, for example, with carboxyl groups or sulfonic acid groups, with carboxyl ester groups or sulfonic ester groups, with carboxylamide groups or sulfonamide groups, with hydroxyl groups or amino groups or with halogen atoms.

If the residue $R_5$ is amino, the amino group may be unsubsituted or may carry one or two or three substituents, preferably alkyl and/or aryl groups. Alkyl substituents may be branched or unbranched. A mono- or dialkylamino group typically contains one or two alkyl groups with one to twenty carbon atoms, preferably with one to six carbon atoms. Examples for monoalkylamino groups are: methylamino, ethylamino, propylamino or butylamino. Examples for dialkylamino groups are: diethylamino, dipropylamino or dibutylamino. Examples for trialkylamino groups are: triethylamino, tripropylamino or tributylamino.

If the residue $R_5$ is halogen, this shall mean a covalent bound fluorine, chlorine, bromine or iodine atom. Preferred are fluorine or chlorine.

If $R_8$ means a di- to tetravalent organic bridge group, this is to be understood as an organic residue which is covalently connected via two, three or four covalent bonds with the remainder of the molecule.

Examples of divalent organic residues are alkylene, alkyleneoxy, poly(alkyleneoxy), alkyleneamino, poly(alkyleneamino), cycloalkylene, arylene, aralkylene, or heterocyclylene. These residues have been disclosed in more detail above.

Alkylene groups can be both branched and unbranched. An alkylene group typically contains one to twenty carbon atoms, preferably two to four carbon atoms. Examples of alkylene groups are: methylene, ethylene, propylene and butylene. Alkylene groups may be substituted, for example with carboxyl groups or sulfonic acid groups, with carboxylic ester groups or sulfonic ester groups, with carboxylamide groups or sulfonamide groups, with hydroxyl groups or amino groups or with halogen atoms.

Alkyleneoxy and poly(alkyleneoxy) groups can contain both branched and unbranched alkylene groups. An alkylene group occurring in an alkyleneoxy or poly(alkyleneoxy) group typically contains two to four carbon atoms, preferably two or three carbon atoms. The number of repeat units in the poly(alkyleneoxy) groups can vary in a wide range. Typical numbers of repeat units are in the range from 2 to 50. Examples of alkyleneoxy groups are: ethyleneoxy, propyleneoxy and butyleneoxy. Examples of poly(alkyleneoxy) groups are: poly(ethyleneoxy), poly(propyleneoxy) and poly(butyleneoxy).

Alkyleneamino and poly(alkyleneamino) groups can contain both branched and unbranched alkylene groups. An alkylene group occurring in an alkyleneamino or poly(alkyleneamino) group typically contains two to four carbon atoms, preferably two or three carbon atoms. The number of repeat units in the poly(alkyleneamino) groups can vary in a wide range. Typical numbers of repeat units are in the range from 2 to 50. Examples of alkyleneamino groups are: ethyleneamino, propyleneamino and butyleneamino. Examples for poly(alkyleneamino) groups are: poly(ethyleneamino), poly(propyleneamino) and poly(butyleneamino).

Cycloalkylene groups typically contain five, six or seven ring carbon atoms, each of which can be substituted independently of one another. Examples of substituents are alkyl groups or two alkyl groups, which together with the ring carbons to which they are attached can form another ring. An example of a cycloalkylene group is cyclohexylene. Cycloalkylene groups may be substituted, for example, with carboxyl groups or sulfonic acid groups, with carboxylic ester groups or sulfonic ester groups, with carboxylamide groups or sulfonamide groups, with hydroxyl groups or amino groups, or with halogen atoms.

Arylene groups typically are cyclic aromatic groups comprising five to fourteen carbon atoms, each of which can be substituted independently of one another. Examples of arylene groups are o-phenylene, m-phenylene, p-phenylene, o-biphenylyl, m-biphenylyl, p-biphenylyl, 1-anthryl, 2-anthryl, 9-anthryl, 1-phenantolyl, 2-phenantolyl, 3-phenantolyl, 4-phenantolyl or 9-phenantolyl. Arylene groups optionally can be substituted, for example with carboxyl groups or sulfonic acid groups, with carboxylic ester groups or sulfonic ester groups, with carboxyl amide groups or sulfonamide groups, with hydroxyl groups or amino groups or with halogen atoms. Additional examples for substituents are alkyl groups or two alkyl groups, which together with the ring carbon atoms to which they are attached can form another ring.

Heterocyclyl groups typically are cyclic groups containing four to ten ring carbon atoms and at least one ring hetero atom, each of which can be substituted independently of one another. Examples of hetero atoms are oxygen, nitrogen, phosphorous, boron, selenium or sulfur. Examples of heterocyclyl groups are furanediyl, thiophenediyl, pyrroldiyl or imidazolediyl. Heterocyclyl groups preferably are aromatic. Heterocyclyl groups optionally can be substituted, for example with carboxyl groups or sulfonic acid groups, with carboxyl ester groups or sulfonic ester groups, with carboxylamide groups or sulfonamide groups, with hydroxyl groups or amino groups or with halogen atoms. Additional examples for substituents are alkyl groups or two alkyl groups, which together with the ring carbon atoms to which they are attached can form another ring.

Aralkylene groups typically are aryl groups, to which one or two alkyl groups are covalently attached. Aralkyl groups can be covalently attached with the remainder of the molecule via their aryl residue and their alkyl residue or via two alkyl residues. The aralkylene group may be substituted at its aromatic ring, for example, with alkyl groups or with halogen atoms. Examples for aralkylene groups are benzylene or dimethylphenylene (xylylene).

Examples of $R_8$ as trivalent organic residue are alkyltriyl, alkoxytriyl, tris-poly(alkyleneoxy), tris-poly(alkyleneamino), cycloalkyltriyl, aryltriyl, aralkyltriyl or heterocyclyltriyl. These residues correspond to the divalent residues already described above, with the difference that they are connected to the remainder of the molecule by three covalent bonds instead of two covalent bonds.

Examples of $R_8$ as tetravalent organic residue are alkylquaternyl, alkoxyquaternyl, quater-poly(alkyleneoxy), quaterpoly(alkyleneamino), cycloalkylquaternyl, arylquaternyl, aralkylquaternyl or heterocyclylquaternyl. These residues correspond to the divalent residues already described above, with the difference that they are connected to the remainder of the molecule by four covalent bonds instead of two covalent bonds.

$R_6$ is an o-times positively charged, preferably a single positively charged monovalent organic residue. This is usually alkyl, alkoxy, haloalkyl, cycloalkyl, aryl, aralkyl or heterocyclyl, which contains one to four positively charged residues, in particular quaternary ammonium residues, quaternary phosphonium residues, ternary sulfonium residues or a one- to four-times charged monovalent heterocyclic residue. The charge is compensated via the anion(s) $X^{q-}$. The connection of the o-times positively charged residue to the piperidine-1-oxyl residue is preferably performed via the hetero atom of the o-times positively charged residue. Particularly preferred examples of residues $R_6$ are the residues —N$^+$R$_{11}$R$_{12}$R$_{13}$, —P$^+$R$_{11}$R$_{12}$R$_{13}$, —S$^+$R$_{11}$R$_{12}$ or -Het$^+$, wherein $R_{11}$, $R_{12}$ and $R_{13}$ independently of one another are hydrogen, alkyl, cycloalkyl, aryl, aralkyl or heterocyclyl, in particular $C_1$-$C_6$-alkyl, cyclohexyl, phenyl or benzyl, and Het is a monovalent and one-times positively charged heterocyclic residue, which has one to three ring nitrogen atoms or one ring nitrogen atom and one to two ring oxygen atoms or ring sulfur atoms, especially preferred a monovalent residue of imidazolium, pyridinium, guanidinium, uronium, thiouronium, piperidinium or morpholinium.

$R_9$ is an m-times positively charged divalent to tetravalent organic residue. This is an organic residue, which has m positively charged groups and which is connected to the remainder of the molecule by two, three or four covalent bonds. Examples of $R_9$ correspond to the examples shown above for $R_8$, with the difference that these residues are additionally substituted with m positively charged groups or have m positively charged groups in the molecular framework. Thus, $R_9$ can mean alkylene, alkyleneoxy, poly(alkyleneoxy), alkyleneamino, poly(alkyleneamino), cycloalkylene, arylene, aralkylene or heterocyclylene that are substituted with m single positively charged groups. Examples of positively charged groups are quaternary ammonium, quaternary phosphonium, ternary sulfonium or an m-times charged divalent to tetravalent heterocyclic residue. The connection of the m-times positively charged residue $R_9$ to the piperidine-1-oxyl residue is preferably performed via the hetero atoms of the m-times positively charged residue. Particularly preferred examples of residues $R_9$ are the residues —$N^+R_{14}R_{15}$—$R_{16}$—$[N^+R_{14}R_{15}]_f$—, —$P^+R_{14}R_{15}$—$R_{16}$—$[P^+R_{14}R_{15}]_f$—, —$S^+R_{14}$—$R_{15}$—$[S^+R_{14}]_f$— oder -$[Het^{m+}]_f$, wherein $R_{14}$ and $R_{15}$ independently of one another are alkyl, cycloalkyl, aryl, aralkyl or heterocyclyl, in particular $C_1$-$C_6$-alkyl, cyclohexyl, phenyl or benzyl, f has the above defined meaning, $R_{16}$ represents an f+ 1-valent organic residue and Het represents a divalent to tetravalent and m-times positively charged heterocyclic residue, which contains one to three ring nitrogen atoms or a ring nitrogen atom and one to two ring oxygen atoms or ring sulfur atoms, especially preferably a divalent to tetravalent residue of imidazolium, pyridinium, guanidinium, uronium, thiouronium, piperidinium, or morpholinium. Examples for $R_{16}$ correspond to the examples for $R_8$.

Examples of divalent organic residues $R_{16}$ are alkylene, cycloalkylene, arylene, aralkylene or heterocyclylene. These residues have already been described in detail above.

Examples of trivalent organic residues $R_{16}$ are alkyltriyl, cycloalkyltriyl, aryltriyl, aralkyltriyl or heterocyclyltriyl. These residues correspond to the divalent residues already described in detail above with the difference that these are connected via three covalent bonds instead of two covalent bonds with the remainder of the molecule.

Examples of tetravalent organic residues $R_{16}$ are alkylquaternyl, cycloalkylquaternyl, arylquaternyl, aralkylquaternyl or heterocyclylquaternyl. These residues correspond to the divalent residues already described in detail above with the difference that these are connected via four covalent bonds instead of two covalent bonds with the remainder of the molecule.

$R_7$ is an u-times negatively charged, preferably a single negatively charged monovalent organic residue. This is usually alkyl, alkoxy, haloalkyl, cycloalkyl, aryl, aralkyl or heterocyclyl, which contains one to four single negatively charged residues, in particular one to four carboxylic acid residues or one to four sulfonic acid residues or a monovalent heterocyclic residue which is substituted with one to four carboxylic acid residues or with one to four sulfonic acid residues. The charge compensation is carried out via the cation(s) $Z^{q+}$. The connection of the u-times negatively charged residue to the piperidine-1-oxyl residue is preferably performed via a carbon atom of the single negatively charged residue.

$R_{10}$ is an m-times negatively charged, preferably a single or double negatively charged divalent to tetravalent organic residue. This is an organic residue, which has m single negatively charged groups and is connected to the remainder of the molecule by two, three or four covalent bonds. Examples of $R_{10}$ correspond to the examples shown above for $R_8$, with the difference that these residues are additionally substituted with m negatively charged groups or have m negatively charged groups in the molecular framework. Thus $R_{26}$ can mean alkylene, alkyleneoxy, poly(alkyleneoxy), alkyleneamino, poly(alkyleneamino), cycloalkylene, arylene, aralkylene or heterocyclylene, which are substituted with m single negatively charged groups. Examples of single negatively charged residues are carboxylic acid residues or sulfonic acid residues or monovalent heterocyclic residues substituted with one to four carboxylic acid residues or with one to four sulfonic acid residues. Charge balancing is carried out via the cation(s) $Z^{q+}$. The connection of the m-times negatively charged residue to the piperidine-1-oxyl residue is preferably performed via a carbon atom of the m-times negatively charged residue.

The redox-active components with formulae Ib and Ie used according to the invention contain counter ions $X^{q-}$. These will compensate for the positive charges which are present in the remainder of the molecule. The counter ions $X^{q-}$ can be inorganic or organic q-valent anions.

Examples of inorganic anions $X^{q-}$ are halogenide ions, such as fluoride, chloride, bromide or iodide, or hydroxide ions or anions of inorganic acids, such as phosphate, sulfate, nitrate, hexafluorophosphate, tetrafluoroborate, perchlorate, chlorate, hexafluoroantimonate, hexafluoroarsenate, cyanide.

Examples of organic anions $X^{q-}$ are anions of mono- or polyvalent carboxylic acids or of mono- or polyvalent sulfonic acids, wherein these acids may be saturated or unsaturated. Examples of anions of organic acids are acetate, formiate, trifluoro-acetate, trifluoromethanesulfonate, pentafluoroethanesulfonate, nonofluorobutane-sulfonate, butyrate, citrate, fumarate, glutarate, lactate, malate, malonate, oxalate, pyruvate or tartrate.

The redox-active components with formulae Ic and If used according to the invention contain counter ions $Z^{q+}$. These will compensate for the negative charges which are present in the remainder of the molecule. The counter ions $Z^{q+}$ can be inorganic or organic q-valent cations.

Examples of inorganic cations $Z^{q+}$ are hydrogen ions or mono- or multi-valent metal ions. Preferably, hydrogen ions or one- or divalent metal ions, especially alkaline or earth alkaline metal cations are used.

Examples of organic cations $Z^{q+}$ are ammonium, imidazolium, pyridinium, guanidinium, uronium, thiouronium, piperidinium, morpholinium, or phosphonium.

Index q is preferably 1 or 2 and more preferred 1.
Index f is preferably 1 or 2 and more preferred 1.
Index l is preferably ½ or 1 and more preferred 1.
Index m is preferably 1 or 2 and more preferred 1.
Index n is preferably ½, 1 or 2 and more preferred ½ or 1.
Index o is preferably 1 or 2 and more preferred 1.
Index u is preferably 1 or 2 and more preferred 1.

Particularly preferred catholytes used in the redox flow battery of the invention, contain as the redox-active component the above defined compounds of the formulae Ia and/or Id.

Also particularly preferred catholytes used in the redox flow battery of the invention contain as a redox-active component the above defined compounds of the formulae Ib and/or Ie or of the formulae Ic and/or If, wherein X is selected from the group of halogenide ions, hydroxide ions, phosphate ions, sulphate ions, perchlorate ions, hexafluorophosphate ions or tetrafluoroborate ions and wherein Z is selected from the group of hydrogen ions, alkali metal cations or alkaline earth metal cations, as well as the substituted or unsubstituted ammonium cations.

Also particularly preferred catholytes used in the redox flow battery of the invention contain as a redox-active component the above defined compounds of the formulae I, Ia, Ib, Ic, Id, Ie or If, wherein $R_1$, $R_2$, $R_3$ and $R_4$ are $C_1$-$C_6$-alkyl, and preferably ethyl or methyl.

Especially preferred catholytes used in the redox flow battery of the invention contain as a redox-active component the above defined compounds of the formula Ia, in which $R_5$ is hydrogen, $C_1$-$C_6$-alkyl, $C_1$-$C_6$-alkoxy, $C_1$-$C_6$-partial- or -perfluoroalkyl, $C_1$-$C_6$-partial- or -perchloroalkyl, $C_1$-$C_6$-fluoro-chloroalkyl, phenyl, benzyl, fluorine, chlorine, hydroxy, amino or nitro.

Also particularly preferred catholytes used in the redox flow battery of the invention contain as a redox-active component the above defined compounds of the formula Id, in which $R_8$ is alkylene, alkyltriyl, alkylquaternyl, alkyloxydiyl, alkyloxytriyl, alkyloxyquaternyl, arylene, aryltriyl, arylquaternyl, heterocyclylene, heterocyclyltriyl or heterocyclylquaternyl, in particular $C_2$-$C_6$-alkylene, such as ethylene or propylene, or $C_2$-$C_6$-alkoxydiyl, such as 1,2-dioxyethylene or 1,3-dioxypropylene, or $C_3$-$C_6$-alkoxytriyl, such as a 1,2,3-propanetriol residue or a trimethylolpropane residue, or $C_4$-$C_6$-alkoxyquaternyl, such as a pentaerithritol residue, or phenylene, phenyltriyl or phenylquaternyl.

In the redox flow battery of the invention the zinc salts used as an anolyte are usually zinc salts in the oxidation stage II. The zinc salts used according to the invention are preferably water-soluble. Zinc salts can have any inorganic or organic anions. Examples of such anions are listed earlier.

In the context of this description, a solubility of at least 1 g of a compound in 1 L of water at 25° C. is to be understood as the water solubility of a compound.

Examples of zinc salts are zinc chloride, zinc fluoride, zinc bromide, zinc iodide, zinc nitrate, zinc nitrite, zinc hydrogen carbonate, zinc sulphate, zinc perchlorate, zinc tetrafluoroborate and zinc hexafluorophosphate. Besides zinc salts with inorganic anions, zinc salts with organic anions can also be used, for example zinc acetate, zinc oxalate or zinc formiate.

As shown in FIG. 2, during the charging process zinc(II) cations dissolved in the electrolyte are reduced to elementary zinc (0) at the surface of the anode. The anode can consist of any electrically conductive material, preferably of metal, in particular of zinc or zinc alloys. By the absorption of two electrons, metallic zinc is deposited on the electrode surface. In the opposite case, metallic zinc from the electrode surface passes over by the release of two electrons to zinc ions, which accumulate in the anolyte.

The redox flow battery according to the invention is characterized by a high environmental compatibility, since toxic redox-active substances can be dispensed completely. Both the redox couple zinc (II)/zink (0) and the redox couple TEMPO$^+$/TEMPO have a low environmental impact in the event of an accident compared to conventional vanadium flow batteries.

Especially preferred redox flow batteries according to the invention have a solid zinc anode with the redox couple zinc(II)/zinc(0).

Other particularly preferred redox flow batteries according to the invention have a 2,2,6,6-tetramethylpiperidinyloxyl-based cathode with the redox couple 2,2,6,6-tetramethylpiperidinyl-N-oxoammonium/2,2,6,6-tetramethylpiperidinyl-N-oxyl.

On the one hand the advantage over the described fully-organic redox flow batteries is the reduction of production costs. The zinc anode can be manufactured much more cost-effective than known organic anodes. On the other hand, the redox couple zinc(II)/zinc(0) is characterized by very good stability against external environmental influences, for example by the sensitivity against oxygen. Conventional systems must be kept free of oxygen; this considerably complicates the construction of the battery and increases the operating costs. When using a zinc anode this can be dispensed with completely.

Furthermore, zinc has a very high overvoltage in aqueous media and thus enables an extremely high potential window.

As a potential window, the voltage (potential range) is to be understood, which can be achieved at maximum due to the position of the redox couples in the area of the electrochemical series between the cathode and the anode without any undesired side reactions or decomposition of the redox-active species, of the conducting additive, of the electrolyte, or of any other component of the entire battery. Conventional aqueous flux batteries are limited to a potential window of 1.2 V. If this is exceeded, hydrogen gas would otherwise develop. By using a zinc anode, the potential window can be extended to more than 2 V. This leads to a significant increase of the electrical output per cell. Zinc has a very high overvoltage over hydrogen, therefore, despite the high voltage of 2 V, no hydrogen is developed at the anode and the battery can be operated safely.

Compared to the already known use of polyaniline particles, the redox flow battery of the invention preferably uses no electrically conductive polymer. This makes it possible to keep the potential of the battery constant over a maximum charge state. Conventional energy storage systems based on conductive polymers are usually characterized by steep potential curves, which often prevent or complicate a practical use as energy storage.

In a preferred embodiment of the redox flow battery according to the invention, the individual 2.2.6.6 tetrasubstituted pyridinyloxyl units are not in conjugation to each other. Thus, the redox reactions of the individual units always take place with the same potential. Likewise, the redox kinetics of 2.2.6.6 tetrasubstituted pyridinyloxy is very fast and allows high charging velocity. 2.2.6.6-Tetrasubstituted pyridinyloxyl, such as TEMPO, is one of the few stable organic radicals and as well as zinc is insensitive to atmospheric oxygen.

Conventional organic redox flow batteries have comparatively low energy densities due to the more limited solubility compared to metal salts. By using the zinc(II)/zinc(0) redox couple and the good solubility of zinc(II) cations in water and in organic solvents, the required volume for the anolyte can be reduced and, depending on the scale of the capacity, even a storage tank can be dispensed with. This reduces the required volume of the entire battery and also increases the overall efficiency of the energy storage, since less or no electrical energy is required for the operation of a pump to circulate the anolyte. Common energy densities for zinc-based hybrid flow batteries are 50-80 Wh/L. The energy densities of redox flow batteries that use only redox-active organic compounds are usually between 2-16 Wh/L.

The redox-active components are preferably used in dissolved form. However, it is also possible to use dispersions of the redox-active components or to use liquid redox-active components.

The molar mass of the redox-active components comprising residues of formula I used in the catholyte according to the invention can vary in a large range. Particularly preferred are redox-active components containing residues of the formula I, whose molar mass are in the range of 150 to 20,000 g/mol, preferably in the range of 150 to 2,000 g/mol, and particularly preferred in the range of 150 to 800 g/mol.

The viscosity of the electrolyte used according to the invention is typically in the range of 1 mPas up to $10^3$ mPas, in particular preferred 1 to $10^2$ mPas and especially preferred 1 to 20 mPas (measured at 25° c. with a rotational viscometer, plate/plate).

The production of the redox-active components comprising residues of formula I according to the invention can be performed according to standard processes of organic synthesis. These procedures are well known to the skilled person.

In addition to the redox-active components described above, the redox flow battery of the invention can contain other elements or components that are common to such cells.

In the redox flow battery according to the invention, selected redox-active components are used in both chambers, which are separated by a semipermeable membrane and which are available in the chambers in dissolved, liquid or in dispersed form.

The electrolyte consists of water or of water and an organic solvent in which additional substances are dissolved. These are used for charge compensation during charging or discharging of the battery or which have a positive effect on the stability or performance parameters of the battery. Substances that are responsible for charge compensation are called conducting additives and substances that have a positive effect on stability or performance parameters are called auxiliary additives. The conducting additives are usually organic or inorganic salts. The electrolyte is also differentiated between catholyte and anolyte. The catholyte contains in addition to the solvent and the conducting/auxiliary additive the redox-active cathode material 2.2.6.6 tetrasubstituted piperidinyloxyl, in particular TEMPO. The anolyte contains in addition to the solvent and the conducting/auxiliary additive the redox-active anode material zinc(II). Likewise, zinc(II) cations can also form part of the additives. Thus, the redox-active anode material zinc(II) can be contained in both the anolyte and in the catholyte.

Examples of electrolyte solvents are water or mixtures of water with alcohols (e.g. ethanol), carbonic esters (e.g. propylene carbonate), nitriles (e.g. acetonitrile), amides (e.g. dimethylformamide, dimethylacetamide), sulfoxides (e.g. dimethylsulfoxide), ketones (e.g. acetone), lactons (e.g. gamma-butyrolactone), lactams (e.g. N-methyl-2-pyrrolidone), nitro compounds (e.g. nitromethane), ethers (e.g. tetrahydrofurane), chlorinated hydrocarbons (e.g. dichloromethane), carboxylic acids (e.g. formic acid, acetic acid), mineral acids (e.g. sulfuric acid, hydrogen halides or halogen hydroacids, respectively). Preferred are water or mixtures of water with carbonic esters (e.g. propylene carbonate) or with nitriles (e.g. acetonitrile). Especially preferred is water.

Examples of conducting salts are salts containing anions selected from the group of halogenide ions (fluoride ion, chloride ion, bromide ion, iodide ion), hydroxide ions, anions of inorganic acids (e.g. phosphate ions, sulfate ions, nitrate ions, hexafluorophosphate ions, tetrafluoroborate ions, perchlorate ions, chlorate ions, hexafluoroantimonate ions, hexafluoroarsenate ions, cyanide ions) or anions of organic acids (e.g. acetate ions, formiate ions, trifluoroacetic acid ions, trifluoromethanesulfonate ions, pentafluoroethanesulfonate ions, nonofluorobutane-sulfonate ions, butyrate ions, citrate ions, fumarate ions, glutarate ions, lactate ions, malate ions, malonate ions, oxalate ions, pyruvate ions, tartrate ions). Particularly preferred are chloride ions and fluoride ions, hydroxide ions, phosphate ions, sulfate ions, perchlorate ions, hexafluorophosphate ions and tetrafluoroborate ions; further cations selected from the group of hydrogen ions ($H^+$), alkali metal cations or earth alkaline metal cations (e.g. lithium, sodium, potassium, magnesium, calcium), zink, iron as well as substituted or unsubstituted ammonium cations (e.g. tetrabutylammonium, tetramethylammonium, tetraethylammonium), wherein the substituents can generally be alkyl groups. Hydrogen ions, lithium ions, sodium ions, potassium ions, tetrabutylammonium ions and their mixtures are particularly preferred. In particular, the conducting salts: NaCl, KCl, $LiPF_6$, $LiBF_4$, $NaBF_4$, $NaPF_6$, $NaClO_4$, NaOH, KOH, $Na_3PO_4$, $K_3PO_4$, $Na_2SO_4$, $NaSO_3CF_3$, $LiSO_3CF_3$, $(CH_3)_4NOH$, n-$Bu_4NOH$, $(CH_3)_4NCl$, n-$Bu_4NCl$, $(CH_3)_4NBr$, n-$Bu_4NBr$, n-$Bu_4NPF_6$, n-$Bu_4NBF_4$, n-$Bu_4NClO_4$ and their mixtures where n-Bu stands for the n-butyl group.

Particularly preferred redox-flow-batteries according to the invention contain in the electrolyte a conducting additive, the anions selected from the group of halide ions, hydroxide ions, phosphate ions, sulphate ions, perchlorate ions, hexafluorophosphate ions or tetrafluoroborate ions, in particular, a conducting additive constructed from these anions and from cations selected from the group of hydrogen ions, alkali metal cations or alkaline earth metal cations, as well as from the substituted or unsubstituted ammonium cations.

Examples of auxiliary additives are surfactants, viscosity modifiers, pesticides, buffers, stabilisers, catalysts, conducting additives, antifreeze agents, temperature stabilisators and/or foam breakers.

Surfactants may be nonionic, anionic, cationic or amphoteric. Especially preferred are nonionic surfactants (e.g. polyalkyleneglycol ethers, fatty alcohol propoxylates, alkylglucosides, alkylpolyglucosides, octylphenolethoxylates, nonylphenol-ethoxylates, saponins, phospholipids)

Examples of buffers are carbon dioxide-bi-carbonate-buffer, carbon dioxide-silicate-buffer, acetic-acid-acetate-buffer, phosphate buffer, ammonia buffer, citric acid buffer or citrate buffer, tris (hydroxylmethyl)-aminomethane, 4-(2-hydroxyethyl)-1-piperazinethanesulfonic acid, 4-(2-hydroxyethyl)-piperazine-1-propanesulfonic acid, 2-(N-morpholino)ethane sulfonic acid, barbital acetate buffer).

The redox potential of the redox-active component can be determined by means of cyclovoltammetry, for example. This procedure is known to the skilled artisan (compare Allen J. Bard and Larry R. Faulkner, "Electrochemical Methods: Fundamentals and Applications", 2001, $2^{nd}$ edition, John Wiley & Sons; Richard G. Compton, Craig E. Banks, "Understanding Voltammetry", 2010, $2^{nd}$ edition, Imperial College Press).

The redox flow battery of the invention contains a semipermeable membrane. This fulfills the following functions
  separation of anode and cathode space
  retention of the redox-active component in the catholyte, thus retention of the cathode active-material
  permeability for the conducting salts of the electrolyte which serve for charge equalization, i.e. for anions and/or cations of the conducting salt or in general for the charge carriers contained in the electrolyte.

The membrane may be, among others, a size-exclusion membrane, e.g. a dialysis membrane, but also an ion-selective membrane. The membrane prevents the redox-active 2.2.6.6-tetrasubstituted piperidinyloxyl compound from entering the anode chamber. The breakthrough of dissolved zinc(II) cations does not have to, but can also be inhibited by the membrane.

The membrane used according to the invention, for example a membrane permeable for ions of the conducting additive or a dialysis membrane, separates the redox-active components in the two chambers.

The materials of the membrane can, depending on the particular application, consist of plastics, ceramics, glasses, metals or sheet-like textile structures. Examples of materials are organic polymers such as cellulose or modified cellulose, for example cellulose ethers or cellulose esters, polyether sulfone, polysulfone, polyvinylidene fluoride, polyesters, polyurethanes, polyamides, polypropylene, polyvinyl chloride, polyacrylonitrile, polystyrene, polyvinyl alcohol, polyphenylene oxide, polyimide, poly-tetrafluoroethylene and derivatives thereof, or furthermore ceramics, glasses or felts. Membranes consisting of a plurality of materials (composites) are also possible.

The membranes and the hybrid flow batteries resulting therefrom can be used in various manifestations. Examples include flat membranes, bag filters and wrapped modules. These embodiments are known to a skilled artisan. Preference is given to using flat membranes.

The membrane used according to the invention can be supported to give better stability, e.g. by a sieve-shaped or perforated plastic material or fabric.

The thickness of the membrane used according to the invention can vary within a wide range. Typical thicknesses are in the range from 0.1 μm to 5 mm, particularly preferred between 10 μm and 200 μm.

In addition to the redox-active components, electrolytes and membranes described above, the redox flow cell according to the invention preferably contains additional components. These are
- conveyor means, such as pumps, tanks and pipes for transport and storage of redox-active components
- electrodes, preferably consisting of or containing graphite, graphite fleece, graphite paper, carbon-nano-tube rugs, charcoal, soot or graphene
- optionally current collectors, such as made from graphite or from metals The positive electrode can contain following additional materials or consist of these:
Titanium coated with noble metal or with diamond, graphite, silicon carbide, in particular titanium coated with platinum and/or iridium and/or ruthenium oxide, diamond or diamond doped with electrically conductive components, e.g. with boron, glass carbon (Lothar Dunsch: electrochemical reactions at glass carbon, Zeitschrift fir Chemie, 14, 12, p 463-468, December 1974), indium-tin-oxide, lead, lead silver alloy, e.g. lead silver alloy with 1% silver, tin, tin oxide, soot, spinels (such as described in EP 0042984), perowskites ($CaTiO_3$), delafossites (containing copper and/or iron oxide), antimony, bismuth, cobalt, platinum and/or platinum black, palladium and/or palladium black, manganese, polypyrrole (such as described in EP 0191726 A2, EP 0206133 A1), stainless steel, hastelloy or iron-chromium-nickel-containing alloys Positive electrodes containing nickel are preferably used when the electrolyte has an alkaline pH value of >=7-8.

For coated electrode materials, the following well-known coating methods can be used: chemical vapour deposition (CVD), physical vapour deposition (PVD), galvanic deposition, current-less deposition from a liquid solution, which contains the metal in dissolved form and a reducing agent and wherein the reducing agent effects the deposition of the desired metal to a surface.

The negative electrode contains zinc and may still contain in addition contain the following materials:
stainless steel, hastelloy or iron-chromium-nickel-containing alloys, graphite, graphite fleece, graphite paper, carbon-nano-tube rugs, charcoal, carbon black or graphene.

The redox flow batteries according to the invention contain current collectors as a further optional but preferred component. These have the task of producing the best possible electrical contact between the electrode material and the external current source or current sink.

In the redox flow batteries according to the invention aluminium, aluminum alloys, copper, stainless steel, hastelloy, iron-chromium-nickel alloys, noble metal-coated titanium or tantalum, in particular titanium coated with platinum and/or iridium and/or ruthenium oxide, niobium, tantalum, hafnium or zirconium may be used as current collectors.

The following well-known coating methods can be used, among others, for the production of coated current collectors: chemical vapour deposition (CVD), physical vapour deposition (PVD), galvanic deposition, electrical deposition from a liquid solution, which contains the metal in dissolved form and a reducing agent and wherein the reducing agent causes the deposition of the desired metal on a surface.

The redox flow battery according to the invention can be used in a wide variety of areas. In the broadest sense, this can be the storage of electrical energy for mobile and stationary applications. The invention also relates to the use of the redox flow battery for these purposes.

Examples of applications are inserts as stationary storage for emergency power supply, for peak load balancing, as well as for the caching of electrical energy from renewable energy sources, in particular in the photovoltaics and wind power sectors, from gas, coal, biomass, tidal, and marine power plants and deployments in the field of electromobility, such as storage in land, air and water vehicles.

The redox flow battery according to the invention is particularly suitable for small redox flow battery systems e.g. for use in the household or also in mobile applications, as this promises on a smaller volume a high electrical power and capacity, a low own power consumption, low toxicity and uncomplicated design as well as low operating costs compared to conventional redox flow batteries.

The redox flow batteries according to the invention can be connected in a known manner in a serial or parallel manner.

The following examples explain the invention without limiting it.

The following examples describe the construction of two possible TEMPO/zinc-hybrid-flow-batteries. Zinc dichloride was used as a redox-active zinc compound. Comparable salts, such as zinc perchlorate or zinc tetrafluoroborate, can also be used.

Example 1

In a first example a TEMPO-methacrylate copolymer was used as a TEMPO compound, which had been copolymerised for improved solubility with [2-(methacryloyloxy)-ethyl]-trimethylammonium chloride. However, polymers with other polymer backbones and/or with other solubility-conveying groups can be used. Sodium chloride was used as an additional conducting additive. As an auxiliary additive, ammonium nitrate was used to adjust the desired pH value and to stabilize the zinc(II)/zinc(0) redox pair. A low-cost dialysis membrane with a size exclusion limit of 1,000 g/mol (Dalton) was used as a membrane.

Figure 4:
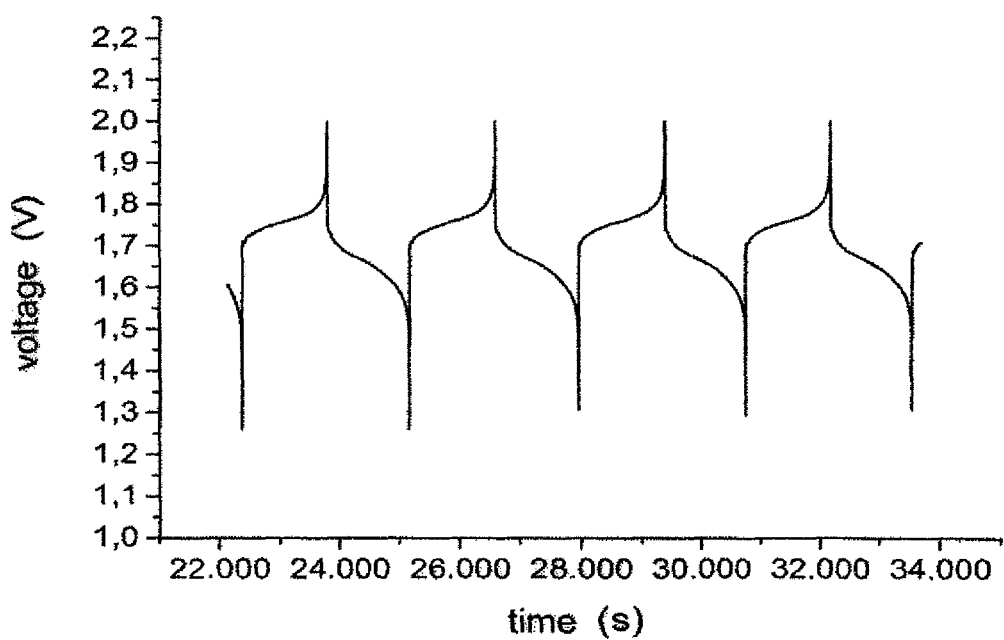
FIG. 4 is an exemplary graph of a charging/discharging curve for a battery according to the invention as exemplified in Example 1.

FIG. 4 shows an exemplary charging/discharging curve of the poly-TEMPO/zinc-hybrid-flow-battery described above. Water was used as an electrolyte solvent.

Example 2

Figure 5:
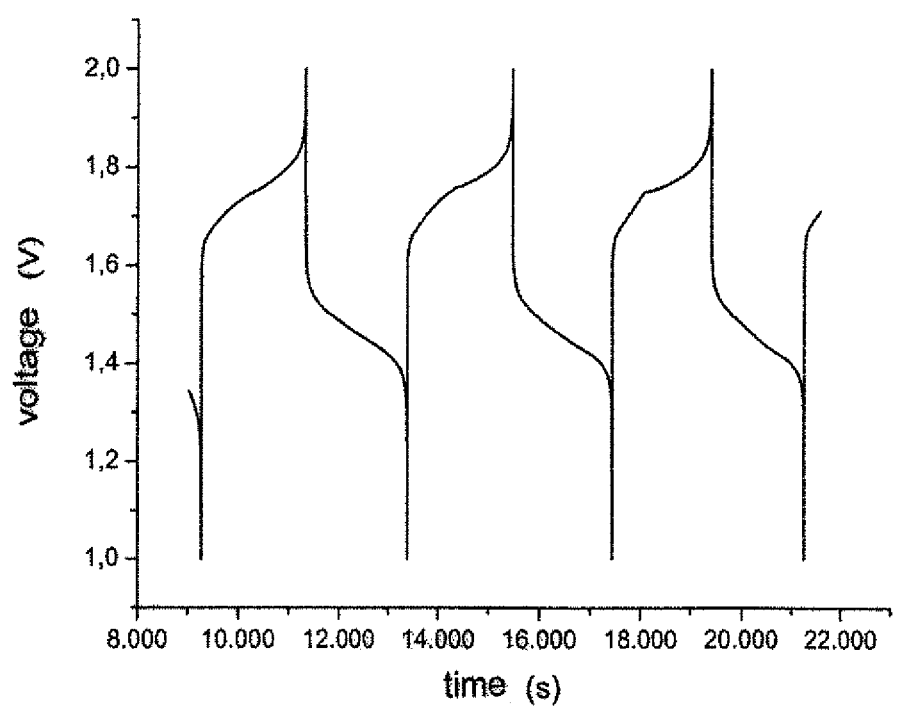
FIG. 5 is an exemplary graph of a charging/discharging-curve for a battery according to the invention as exemplified in Example 2.

Furthermore, the low molecular TEMPO derivative 4-hydroxy-2.2.6.6-tetramethyl-piperidine-1-oxyl (TEMPOL) was used in a second exemplary battery. Likewise, in the 4-position other residues can be present, which improve the solubility of the TEMPO compound. A low-cost dialysis membrane with a size exclusion limit of 1,000 g/mol (Dalton) was used as a membrane. Especially when using low-molecular TEMPO derivatives the use of an ion-selective membrane is also possible, which is only passable for certain substances, e.g. only for anions or cations. FIG. 5 shows an exemplary charging/discharging-curve of the TEMPOL/zinc-hybrid-flow-battery described above. Water was used as an electrolyte solvent.

The batteries, designed in the laboratory scale, are characterized by their extremely simple construction, by very good stability and longevity. This is mainly due to the use of very stable and oxygen-insensitive redox-active substances. From the outset, stable charging/discharging curves with high mean voltages of over 1.75 V for charging operations and voltages above 1.65 V for discharge operations can be achieved (cf. FIGS. 4 and 5). So far, such high voltages could only be achieved by using significantly more toxic and/or more expensive redox-active compounds. The use of aqueous electrolytes also enables the attainment of higher current densities in the charging or discharging process compared to non-aqueous organic electrolytes.

The invention claimed is:

1. A redox flow battery for storing of electrical energy comprising a reaction cell having two electrode chambers for catholyte and anolyte, which are each connected to at least one store for liquid and are separated by a semipermeable membrane that is impermeable for the redox pair in the catholyte, and which are equipped with electrodes, wherein the electrode chambers are each filled with electrolyte solutions comprising redox-active components in liquid state, dissolved or dispersed in an aqueous electrolyte solvent, as well as optionally conducting salts dissolved therein and optionally further additives, wherein the anolyte comprises zinc salt as redox-active component and wherein the catholyte comprises as a redox-active component a compound of formulae Ia, Ib, Ic, Id, Ie and/or If

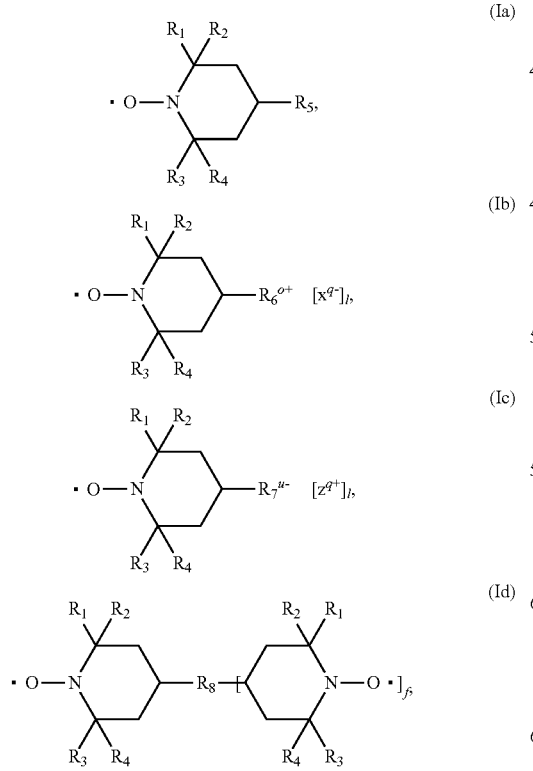

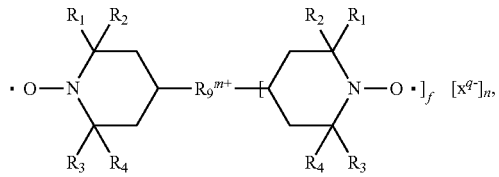

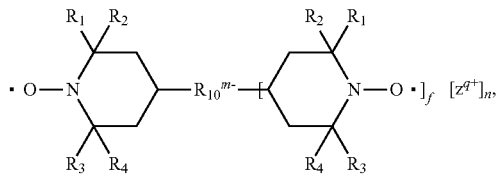

wherein
R$_1$, R$_2$, R$_3$ and R$_4$ independently of one another represent alkyl, cycloalkyl, aryl or aralkyl,
X is a q-valent inorganic or organic anion or a mixture of such anions,
q is an integer from 1 to 3,
is an integer from 1 to 4,
u is an integer from 1 to 4,
R$_5$ is alkyl, alkoxy, haloalkyl, cycloalkyl, aryl, aralkyl, heterocyclyl, halogen, hydroxy, amino, nitro or cyano,
R$_6$ is an o-times positively charged monovalent organic residue, or an o-timespositively charged monovalent heterocyclic residue,
R$_7$ is an u-times negatively charged monovalent residue or an u-times negatively charged monovalent heterocyclic residue,
R$_8$ is a two- to four-valent organic bridge group,
R$_9$ is an m-times positively charged two-to four-valent organic residue, or an m-times positively charged two to four-valent heterocyclic residue,
R$_{10}$ is an m-times negatively charged two-to-four-valent organic residue,
Z is a q-valent inorganic or organic cation or a mixture of such cations,
f is an integer from 1 to 3,
l is a number with the value o/q or u/q,
m is an integer from 1 to 4, and
n is a number with the value m/q,
and wherein zinc is used as redox-active, energy storage anode component of the battery and undergoes reduction and oxidation at the anode during charging and discharging of the battery using the redox couple zinc (II)/zinc (0); and
wherein a compound of formula Ia, Ib, Ic, Id, Ie and/or If is used as redox-active, energy storage cathode component of the battery and undergoes oxidation and reduction at the cathode during charging and discharging of the battery, wherein 2.2.6.6-tetrasubstituted piperidinyloxyl units of compounds of formula Ia, Ib, Ic, Id, Ie and/or If are oxidized to N-oxoammonium units during the charging process and are reduced to piperidinyloxyl units when discharged.

2. The redox flow battery according to claim 1, wherein the electrolyte comprises water or water and an organic solvent, in which additional compounds are dissolved.

3. The redox flow battery according to claim 1, wherein R$_6$ is a single positively charged monovalent quaternary ammonium residue, a quaternary phosphonium residue, or a ternary sulfonium residue, or a single positively charged monovalent heterocyclic residue, $R_9$ is an m-times positively charged two- to four-valent quaternary ammonium residue, a two-to four-valent quaternary phosphonium residue, a two-to-three-valent ternary sulfonium residue or an m-times positively charged two to four-valent heterocyclic residue, $R_7$ is a single negatively charged monovalent carboxyl or sulfonic acid residue or a single negatively charged monovalent heterocyclic residue, and $R_{10}$ is an m-times negatively charged two-to-four-valent alkylene residue substituted with one or two carboxyl groups or sulfonic acid groups, or a phenylene residue substituted with one or two carboxyl groups or sulfonic acid groups, or a two-valent heterocyclic residue substituted with one or two carboxyl groups or sulfonic acid groups.

4. The redox flow battery according to claim 1, wherein the redox-active component in the catholyte is a compound of formulae Ia or Id.

5. The redox flow battery according to claim 1, wherein X is selected from the group consisting of halogenide ions, hydroxide ions, phosphate ions, sulfate ions, perchlorate ions, hexafluorophosphate ions or tetrafluoroborate ions and wherein Z is selected from the group consisting of hydrogen ions, alkali metal cations or earth alkaline metal cations, and of the substituted or unsubstituted ammonium cations.

6. The redox flow battery according to claim 1, wherein redox-active compounds are used, in which $R_5$ is $C_1$-$C_6$-alkyl, $C_1$-$C_6$-alkoxy, $C_1$-$C_6$-partial- or perfluoroalkyl, $C_1$-$C_6$-partial- or perchloroalkyl, $C_1$-$C_6$-fluorochloroalkyl, phenyl, benzyl, fluorine, chlorine, hydroxy, amino or nitro.

7. The redox flow battery according to claim 1, wherein redox-active compounds of formula Id are used, in which $R_8$ is alkylene, alkyltriyl, alkylquaternyl, alkyloxydiyl, alkyloxytriyl, alkyloxyquaternyl, arylene, aryltriyl, arylquaternyl, heterocyclylene, heterocyclyltriyl or heterocyclylquaternyl.

8. The redox flow battery according to claim 1, wherein $R_1$, $R_2$, $R_3$ and $R_4$ are $C_1$-$C_6$-alkyl.

9. The redox flow battery according to claim 1, wherein the redox flow battery contains a solid matter zinc anode with the redox couple zinc(II)/zinc(0).

10. The redox flow battery according to claim 1, wherein the electrolyte contains a conducting salt which comprises anions selected from the group consisting of halogenide ions, hydroxide ions, phosphate ions, sulfate ions, perchlorate ions, hexafluorophosphate ions or tetrafluoro-borate ions, preferably a conducting salt composed of these anions and of cations selected from the group consisting of hydrogen ions, alkali metal cations or earth alkaline metal cations, as well as of substituted or unsubstituted ammonium cations.

11. A redox flow battery for storing of electrical energy comprising a reaction cell having two electrode chambers for catholyte and anolyte, which are each connected to at least one store for liquid and are separated by a semipermeable membrane that is impermeable for the redox pair in the catholyte, and which are equipped with electrodes, wherein the electrode chambers are each filled with electrolyte solutions comprising redox-active components in liquid state, dissolved or dispersed in an aqueous electrolyte solvent, as well as optionally conducting salts dissolved therein and optionally further additives, wherein the anolyte comprises zinc salt as redox-active component and wherein the catholyte comprises as a redox-active component a compound of formula Ib

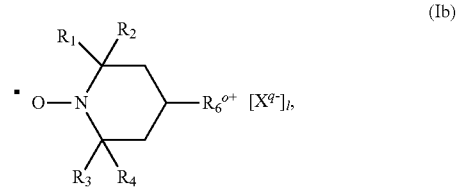

wherein $R_1$, $R_2$, $R_3$ and $R_4$ independently of one another represent alkyl, cycloalkyl, aryl or aralkyl, X is a q-valent inorganic or organic anion or a mixture of such anions, q is an integer from 1 to 3, is an integer from 1 to 4, u is an integer from 1 to 4, $R_6$ is an o-times positively charged monovalent organic residue, or an o-timespositively charged monovalent heterocyclic residue, l is a number with the value o/q or u/q, and wherein zinc is used as redox-active, energy storage anode component of the battery and undergoes reduction and oxidation at the anode during charging and discharging of the battery using the redox couple zinc (II)/zinc (0); and wherein a compound of formula Ib is used as redox-active, energy storage cathode component of the battery and undergoes oxidation and reduction at the cathode during charging and discharging of the battery, wherein 2.2.6.6-tetrasubstituted piperidinyloxyl units of compounds of formula Ib are oxidized to N-oxoammonium units during the charging process and are reduced to piperidinyloxyl units when discharged.

12. The redox flow battery according to claim 11, wherein $R_6$ is a single positively charged monovalent quaternary ammonium residue.

13. The redox flow battery according to claim 12, wherein $R_6$ is the residue $N^+R_{11}R_{12}R_{13}$, wherein $R_{11}$, $R_{12}$ und $R_{13}$ independently of one another are alkyl, cycloalkyl, aryl, aralkyl or heterocyclyl.

14. The redox flow battery according to claim 13, wherein $R_{11}$, $R_{12}$ und $R_{13}$ independently of one another are $C_1$-$C_6$-alkyl, cyclohexyl, phenyl or benzyl.

15. A redox flow battery for storing of electrical energy comprising a reaction cell having two electrode chambers for catholyte and anolyte, which are each connected to at least one store for liquid and are separated by a semipermeable membrane that is impermeable for the redox pair in the catholyte, and which are equipped with electrodes, wherein the electrode chambers are each filled with electrolyte solutions comprising redox-active components in liquid state, dissolved or dispersed in an aqueous electrolyte solvent, as well as optionally conducting salts dissolved therein and optionally further additives, wherein the anolyte comprises zinc salt as redox-active component and wherein the catholyte comprises as a redox-active component a compound of formulae Ia, Ib, Ic, Id, Ie and/or If

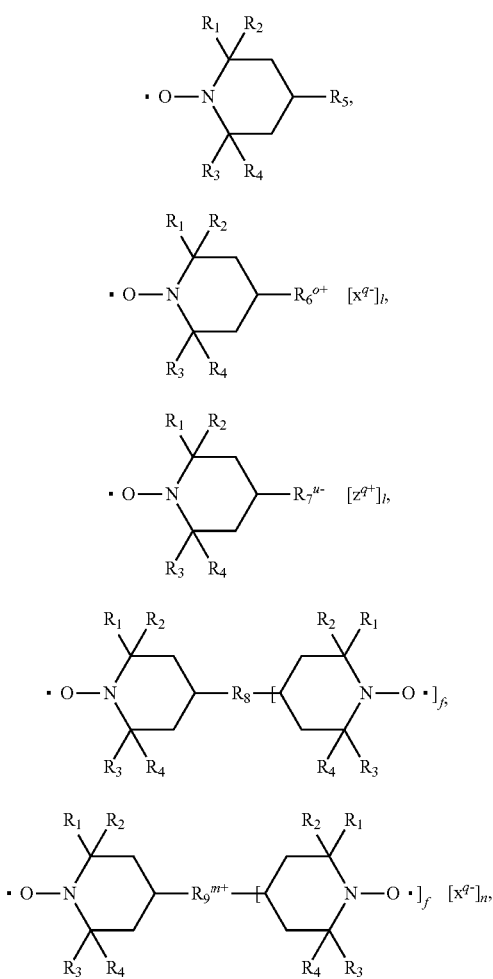
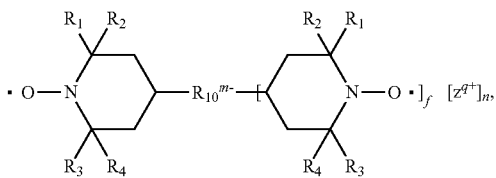

wherein
$R_1$, $R_2$, $R_3$ and $R_4$ independently of one another represent alkyl, cycloalkyl, aryl or aralkyl,
X is a q-valent inorganic or organic anion or a mixture of such anions,
q is an integer from 1 to 3,
is an integer from 1 to 4,
u is an integer from 1 to 4,
$R_5$ is alkyl, alkoxy, haloalkyl, cycloalkyl, aryl, aralkyl, heterocyclyl, halogen, hydroxy, amino, nitro or cyano,
$R_6$ is an o-times positively charged monovalent organic residue, or an o-timespositively charged monovalent heterocyclic residue,
$R_7$ is an u-times negatively charged monovalent residue or an u-times negatively charged monovalent heterocyclic residue,
$R_8$ is a two- to four-valent organic bridge group,
$R_9$ is an m-times positively charged two-to four-valent organic residue, or an m-times positively charged two to four-valent heterocyclic residue,
$R_{10}$ is an m-times negatively charged two-to-four-valent organic residue,
Z is a q-valent inorganic or organic cation or a mixture of such cations,
f is an integer from 1 to 3,
l is a number with the value o/q or u/q,
m is an integer from 1 to 4, and
n is a number with the value m/q,
wherein the redox-active species of the anolyte consists of zinc salt.

* * * * *